3,272,360
APPARATUS FOR FEEDING AN EGG-PROCESSING MACHINE

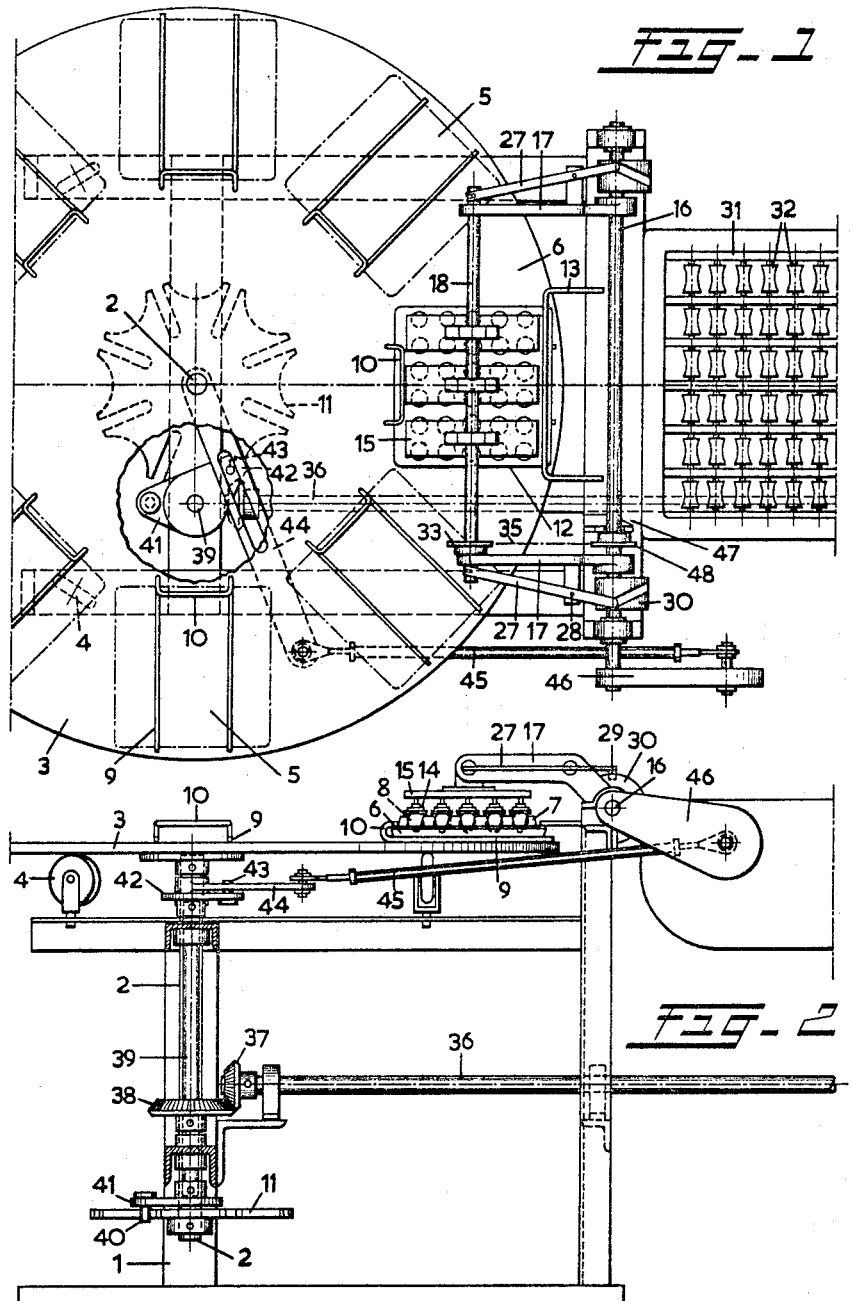

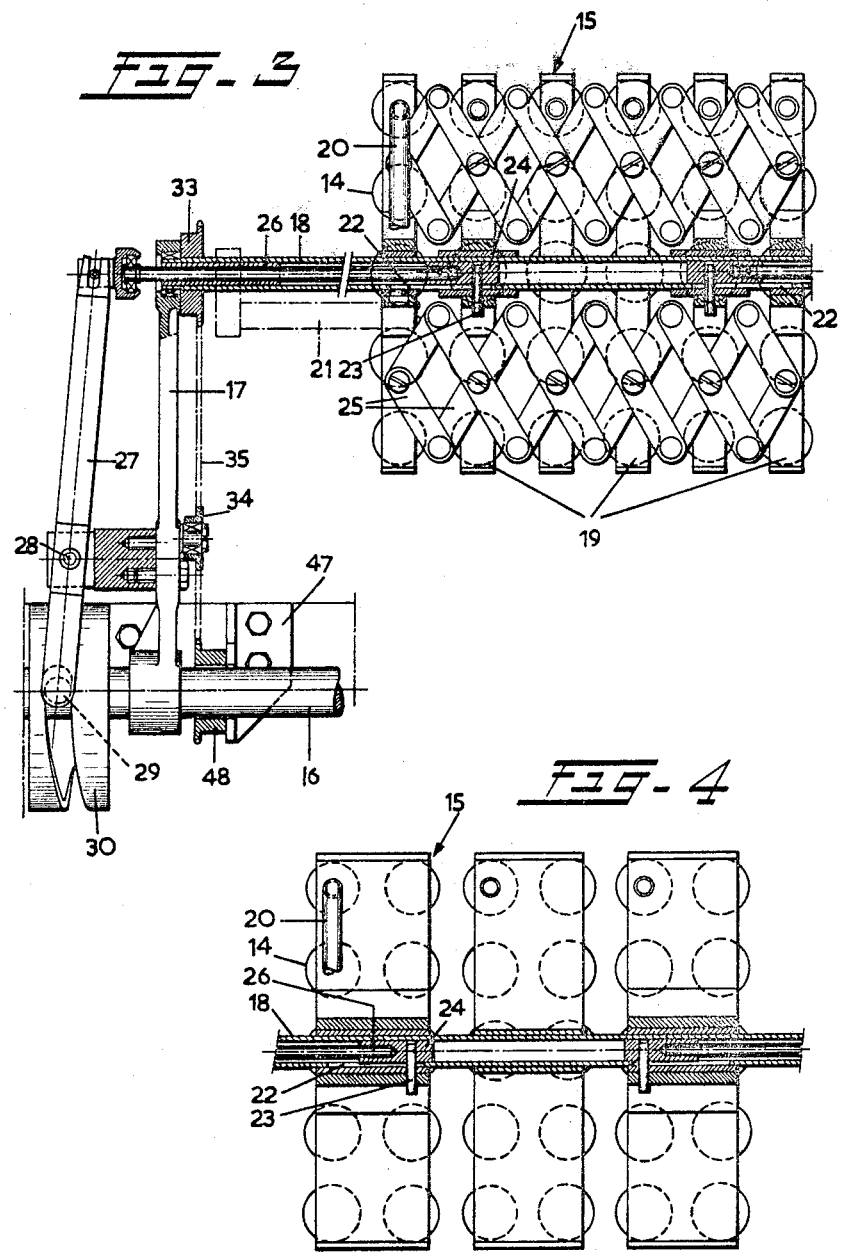

Jelle van der Schoot, Aalten, Netherlands, assignor to Van Katwijk's Industrieen N.V., Aalten, Netherlands
Filed Oct. 5, 1964, Ser. No. 401,304
8 Claims. (Cl. 214—309)

This invention relates to an apparatus for feeding an egg-processing machine.

Eggs are conventionally packed, sold and transported on plates of papier-mache having six rows of five egg seats. A machine of the type with which the present invention is concerned has the task of unloading such plates loaded with eggs, and supplying the eggs to conveyor belts moving in mutually parallel relationship and each having spaced along its length a series of egg seats, said conveyor belts supplying the eggs to the processing station.

The emptying of the plates is usually effected by means of vacuum-power operated suction cups arranged on a carrier construction similarly to the arrangement of the seats of the egg plates, the eggs being each gripped by a suction cup, whereafter the carrier construction is moved to bring the eggs to a position over the seats carried by the conveyor belts, where the eggs are released to be further transported to the processing station by the conveyor belts.

There are arrangements of this type in which the loaded egg plates are taken from a case or other container by an operator and placed on a supply belt for such plates, which transports them to a station where the plates are emptied, that is to say, a station where the supply belt, or at least the plate supplied on it, is stopped, whereafter the carrier structure provided with suction cups can be lowered, engage the eggs, lift them off the plate, move them to and release them in the adjacent seats of one or more conveyor belts.

If the emptied plates are thereafter discharged in the same direction as that in which the loaded plates are supplied, a second operator is required to remove the plates from the conveyor belt and collect them at a location on the other side of the processing machine.

If it is desired to have one and the same operator perform these simple functions of placing loaded plates on to the supply belt and removing emptied plates from a discharge belt and collecting them, it has hitherto required a rather complicated arrangement to transfer the emptied plates from the supply belt to a second conveyor belt which returns them beside or below the supply belt to the first operator.

Not only is such an arrangement, particularly the mechanism for transferring the plates from one belt to the other, cumbersome and hence expensive, but it moreover has the disadvantage that, at the rate at which the carrier structure is moved to and fro, it requires the continuous attention of the operator and leaves him no time, for example to bring a new container with loaded egg plates within his reach or to attend to the removal of a container filled with empty plates, so that he has to rely on the help of others for this work.

It is an object of this invention to provide an apparatus of this type which is not only much simpler, but at the same time free of the disadvantage referred to hereinbefore. To this effect, according to the present invention, the apparatus comprises a turntable having a plurality of accommodating stations, on each of which an egg plate can be easily placed, restrained from lateral displacement and from being lifted off the table, and again easily removed from it, said turntable being arranged to be turned stepwise in such a manner that each accommodating station will successively be at a station for emptying a loaded egg plate, said emptying station comprising a structure for carrying vacuum-power operated suction cups arranged in the same pattern as the seats of said egg plates, said carrier structure being arranged to be moved to a position over the egg plate present on the emptying station, to engage by vacuum-power the eggs carried by said plate, and then to be turned to a position over the conveyor belts to transmit the eggs to seats carried by said belts, while during this movement the rows are spread in accordance with the spacing of the conveyor belts.

If, for example, the turntable has eight accommodating stations, the operator will have at least three, and with a little effort even five, loading and unloading stations within his immediate reach by taking at most a single step to the left or to the right, and which he can attend to independently of the rate at which the egg plates are emptied at the emptying station. Consequently he is not accurately bound by the rate of operation of the apparatus, and since this rate is conveniently not very high, he can easily spare two or three seconds for displacing a container or doing similar work, having a drink or relaxing in any other way.

Some embodiments of the invention will now be described, by way of example, with reference to the accompanying drawings, in which:

FIGURES 1 and 2 illustrate a plan view and a side elevation, respectively, of an apparatus according to the present invention;

FIGURE 3 is a part-sectional plan view of one embodiment of the carrier structure for the suction cups, and also illustrates the manner in which the beams carrying such suction cups are spread;

FIGURE 4 shows a different embodiment of this carrier structure.

Referring to the drawings, the apparatus comprises a frame 1, in which a turntable 3 is journalled for rotation about a vertical shaft 2 and supported relative to the frame by rollers 4.

Spaced along the periphery of the table are eight accommodating stations 5, each adapted to receive an egg plate 6 of conventional construction. Such egg plates are made of papier-mache and comprises a plane web portion, relative to which hollow projections 7 extend upwardly and downwardly, cooperating with each other to form seats for eggs. Conventionally, such an egg plate provides six rows of five seats, each for one egg to be placed in it by its small end. The accommodating stations on the turntable are each provided with two parallel and approximately radially extending guide rails 9, which serve for preventing lateral movement of a plate accommodated on the station, and terminate at their inner end in a bent, hook-like portion 10 which engages the edge of the plate and serves, on the one hand, as a stop for determining the radial position of a plate end, on the other hand, serves as a means for preventing the plate from being lifted off its place.

The turntable 3 is driven for stepwise rotation by means of a Maltese cross arrangement 11, each accommodating station each time taking the position occupied by that station which is next in the direction of rotation. One of the eight positions in which, successively, each of the eight stations is stopped for a pre-determined time interval is the egg-delivery station 12, where the loaded egg plates 6 are emptied. At station 12, as the table rotates, an accommodating station 5 comes under a plate 13, which is fixedly mounted on the frame of the apparatus and extends horizontally and radially towards the center of the table to engage the upper edge of a plate 6 received in the accommodating station, thereby to adequately prevent such plate from being lifted off its place in collaboration with the bent portion 10 of the guide rails 9.

A structure 15 carrying suction cups 14 is mounted for hinging movement about a shaft 16, and is carried by two arms 17 supporting between them a hollow rod 18.

In the embodiment of such a carrier structure as shown in FIG. 3, six hollow beams 19 are mounted on rod 18 for sliding movement but restrained from rotation, each of said beams carrying a row of five suction cups, and being connected to a vacuum conduit 21 by means of a flexible hose 20.

A portion of the length of rod 18 is provided with longitudinal slots 22. Two beams 19, located symmetrically relative to the carrier structure, are provided with pins 23 extending through such slots into a bore in followers 24 sliding in the interior of the rod 18; the other beams 19 are connected with the beams coupled with these followers by means of lazy tongs 25.

The followers are each coupled with a bar 26 capable of reciprocating within rod 18 and projecting from the latter at its end, where the bar has a universal joint with the end of a lever 27, which is universally pivotable about a fixed pivot 28, and the other end of which carries a cam follower 29 adapted to cooperate with a fixed guide 30, the arrangement being such that when the carrier structure moves about the shaft 16, the bars 26 and the followers 24 perform a corresponding axial movement longitudinally of the rod 18, which causes the beams 19 to spread and brings them together again.

In order to maintain the horizontal position of the beams 19 during the movement of the carrier structure 15, a chain 35 is lapped about a sprocket 33 fixedly mounted on rod 18 adjacent the end of the latter, about a sprocket 34 journalled in arm 17 for free rotary movement, and about a sprocket 48 fixedly mounted on the frame structure 47 around the shaft 16.

In the embodiment of such a carrier structure as depicted in FIG. 4, only three beams are present, which each carry, as one rigid whole, two rows of suction cups. The central one of these beams is not slidable relative to rod 18, and the two others are. As a consequence, the lazy tongs may be omitted. For the rest, the coupling of the two slidable beams by means of pins 23 with followers 24 and bars 26 is exactly as described hereinbefore.

Disposed for movement in parallel, side-by-side relationship in radial alignment with the emptying station 12 are six conveyor belts 31, each carrying a series of seats, each for one egg, which seats are located one behind the other and may be formed by rollers 32 having a concave generatrix and mounted on these belts. Instead of six conveyor belts, it is possible to use one single conveyor belt having six rows of such seats. At the end of its swinging movement, the carrying structure is located over the supply end of the active run of the conveyor belt or belts 31, and the beams 19 are spread in such a manner that each egg carried by a suction cup is over a seat on a conveyor belt, to which it can be delivered by releasing the vacuum in the suction cup.

In the embodiment shown in FIG. 4, the spacing of the conveyor belts, at least of the rows of seats and that of the two rows of suction cups on one beam have been so selected that the suction cups can engage and dislodge two adjacent rows of eggs resting on a plate, and deliver these eggs to seats on two adjacent conveyor belts, at least of two adjacent rows of conveyor belt seats.

The apparatus is driven by means of a main shaft 36 driven from the egg processing machine to actuate, by means of gears 37, 38, a vertical shaft 39 which carries at its bottom end a crank 41 having a pin 40, for driving the Maltese cross 11 mounted on the shaft 2 of turntable 3, by means of which the uniform rotation of the shaft 39 is converted into a stepwise rotation of turntable 3. By means of a second crank 42, mounted at the top end of shaft 39 and carrying a pin 43 extending through a longitudinal slot in an arm 44 adapted to swivel about shaft 2 in a horizontal plane, an oscillating movement is imparted to arm 44, which movement is transmitted by a rod 45 pivoted to the end of arm 44 to a crank 46 pivoting about the shaft 16 and fixedly connected with an arm 17, which crank 46 also serves as a counterweight for the carrier structure 15, so that the rotation of shaft 39 is converted into an oscillating movement of this carrier structure.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. An apparatus for automatically feeding an egg-processing machine to which the eggs are supplied on plates each having a plurality of rows of egg seats comprising a plurality of conveyor belts corresponding with the number of rows of egg seats moved in mutually parallel relationship and each having a row of egg seats spaced along its length to convey the eggs to a processing station, the spacing between said conveyor belts exceeding that of the rows of egg seats on said plates, a turntable having a plurality of accommodating stations on each of which an egg plate may be placed, means restraining said plate from lateral displacement and from being lifted off said table, means for rotating said turntable intermittently so that each accommodating station will successively be halted at an emptying station for emptying a loaded egg plate, carrier means having vacuum-power operated suction cups mounted thereon in rows corresponding to the seats of said egg plates, means for moving said suction cups to a position over the egg plate at said emptying station to engage by vacuum-power the eggs carried by said plate and then moving said cups with eggs attached to a position over said conveyor belts to transfer the eggs to the seats on said belts, and means operable during this movement to spread the rows of suction cups with eggs attached to correspond with the spacing of said conveyor belts.

2. An apparatus according to claim 1 wherein said carrier means comprises arms pivotally supporting said suction cups, a fixed shaft and means for oscillating said arms on said shaft so that during the movement of said cups the mouths of said suction cups are at all times located in a horizontal plane.

3. An apparatus according to claim 2 wherein a rod is carried by said arms and the suction cups for engaging the eggs resting in one row of seats on an egg plate are mounted on a rigid support member slidable in a transverse direction along said rod.

4. An apparatus according to claim 1 wherein lazy tongs are provided for uniformly spreading said cups in accordance with the spacing between said conveyor belts.

5. An apparatus according to claim 3, wherein each egg plate has six rows of egg seats and six conveyor belts equipped with egg seats moving in side-by-side relationship, said carrier means comprising three support members on each of which two rows of suction cups are fixedly mounted, the central one of said support members being fixed to said rod, and the two other being slidable, the spacing between the two rows of suction cups on a support member and that of the conveyor belts being so selected that the suction cups of one support member can engage and lift two adjacent rows of eggs resting on an egg plate and deliver the same to seats on two adjacent conveyor belts.

6. An apparatus according to claim 3 wherein the displacement of the support members along said rod is derived from the movement of said rod and from the movement of the arms supporting said rod.

7. An apparatus according to claim 1 wherein the intermittent rotation of said turntable is effected by means of a Maltese cross.

8. An apparatus according to claim 1 wherein means are provided for driving all moving parts of the apparatus in mutual synchronism.

References Cited by the Examiner

FOREIGN PATENTS 58,620  8/1939  Norway.

EVON C. BLUNK, *Primary Examiner.*

E. A. SROKA, *Assistant Examiner.*